US012385154B2

(12) United States Patent
Kim et al.

(10) Patent No.: US 12,385,154 B2
(45) Date of Patent: Aug. 12, 2025

(54) ADDITIVE COMPOSITION FOR PLATING SOLUTION

(71) Applicants: Mi Yun Kim, Gyeonggi-do (KR); Seon Young Park, Gyeonggi-do (KR); Hye Soo Park, Gyeonggi-do (KR)

(72) Inventors: Mi Yun Kim, Gyeonggi-do (KR); Seon Young Park, Gyeonggi-do (KR); Hye Soo Park, Gyeonggi-do (KR)

( * ) Notice: Subject to any disclaimer, the term of this patent is extended or adjusted under 35 U.S.C. 154(b) by 0 days.

(21) Appl. No.: 18/273,583

(22) PCT Filed: Jan. 21, 2022

(86) PCT No.: PCT/KR2022/001110
§ 371 (c)(1),
(2) Date: Jul. 21, 2023

(87) PCT Pub. No.: WO2022/158896
PCT Pub. Date: Jul. 28, 2022

(65) Prior Publication Data

US 2024/0076792 A1 Mar. 7, 2024

(30) Foreign Application Priority Data

Jan. 21, 2021 (KR) ........................ 10-2021-0008824

(51) Int. Cl.
*C25D 3/00* (2006.01)
*B05D 1/00* (2006.01)
*C23C 18/00* (2006.01)
*C25D 3/58* (2006.01)
*C25D 5/00* (2006.01)

(52) U.S. Cl.
CPC ................. *C25D 3/58* (2013.01); *B05D 1/00* (2013.01); *C23C 18/00* (2013.01); *C25D 5/627* (2020.08)

(58) Field of Classification Search
CPC .. C25D 3/58; C25D 5/627; B05D 1/00; C23C 18/00
USPC ........................................................ 106/1.13
See application file for complete search history.

(56) References Cited

U.S. PATENT DOCUMENTS 3,389,060 A 6/1968 Greene

FOREIGN PATENT DOCUMENTS

| | | | | |
|---|---|---|---|---|
| JP | 9-67693 | A | | 3/1997 |
| JP | 2017166003 | A | * | 9/2017 |
| KR | 10-2007-0026832 | A | | 3/2007 |
| KR | 10-2011-0045704 | A | | 5/2011 |
| KR | 20110045704 | A | * | 5/2011 |
| KR | 10-2016-0076761 | A | | 7/2016 |
| KR | 10-2016-0100364 | A | | 8/2016 |

OTHER PUBLICATIONS

International Search Report for PCT/KR2022/001110 mailed on May 9, 2022.

* cited by examiner

*Primary Examiner* — James E McDonough
(74) *Attorney, Agent, or Firm* — The PL Law Group, PLLC

(57) ABSTRACT

An additive composition for plating solution is to enhance wear resistance and gloss properties of plating. The additive composition may include at least one material selected from the group consisting of tungsten, phosphorus and indium. When the additive composition for a plating solution is added to an existing IR plating solution, it can be used for a long period of time, and the gloss becomes excellent after plating, and the gloss-lasting time is prolonged.

8 Claims, No Drawings

ADDITIVE COMPOSITION FOR PLATING SOLUTION

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/001110, filed Jan. 21, 2022, which claims priority to the benefit of Korean Patent Application No. 10-2021-0008824 filed in the Korean Intellectual Property Office on Jan. 21, 2021, the entire contents of which are incorporated herein by reference.

BACKGROUND

1. Technical Field

The present invention relates to an additive composition for a plating solution in order to improve the disadvantages of plating.

2. Background Art

Plating means thinly coating the surface of an object with another material to make the surface state of the object more useful than the properties of the material used for the object. In general, the plating refers to coating a product such as metal or plastics with another metal material.

While nickel has the advantage of low price and having good plating color, it involves fatal disadvantages that are harmful to the human body and cause allergies, therefore, is not suitable for plating accessories.

Rhodium is a hard but soft silvery-white metal, has a high melting point and is not easily soluble in acids. Also, this is often used for plating because of excellent corrosion resistance and abrasion resistance, and is typically called original rhodium (hereinafter abbreviated as 'OR') plating. When a metal is plated with rhodium, a white color like platinum can be obtained. Accordingly, high-quality accessories with rhodium plating are widely used, and in particular, it is widely used for plating accessories used for bags or the like. If non-oxidized rhodium is plated on silver products, it will always be able to maintain its shiny luster, and rhodium plating is highly durable and has no allergic reaction.

Despite these advantages, rhodium has the disadvantage that it is much more expensive than gold or platinum. Due to this price problem, a plating method to achieve a color similar to OR plating by mixing copper, tin, and zinc, has been developed, and is called imitation rhodium (hereinafter abbreviated as 'IR') plating. IR plating looks similar to OR plating in terms of appearance. However, since tin is the main component, oxidation starts from the moment when it is exposed to air or comes into contact with water. Therefore, the plating entails lowered stability and becomes cloudy. Also, durability is markedly deteriorated to cause low wear resistance. Further, as time passes, discoloration progresses quickly and thus the product cannot be used for a long period of time. Moreover, there is a disadvantage in that commercial value (or marketability) is deteriorated due to the whitening phenomenon.

SUMMARY

The present invention has been devised to improve the disadvantages of IR plating as described above, and an object of the present invention is to provide an additive composition capable of enhancing wear resistance and/or gloss of plating so that hardness and gloss can be maintained even with repeated stimulation, as well as a plating solution composition including the additive composition.

In order to achieve the above object, the present invention provides an additive composition for a plating solution, including at least one material selected from the group consisting of tungsten, phosphorous and indium.

According to an aspect of the present invention, the tungsten may be sodium tungsten.

According to another aspect of the present invention, the phosphorus may be sodium hypophosphite monohydrate or potassium pyrophosphate.

According to another aspect of the present invention, the indium may be indium sulfate.

According to another aspect of the present invention, a relative weight ratio of the phosphorus to the tungsten may be 1:1 to 10.

According to another feature, a relative weight ratio of the tungsten to the indium may be 1:400 to 600.

According to another feature, a relative weight ratio of the phosphorus to the indium may be 1:1000 to 2500.

When the additive composition for a plating solution according to the present invention is added to the existing IR plating solution, the wear resistance of the plating is improved to allow use for a long time. Further, gloss after plating is excellent and the gloss is continuously maintained for an extended time.

Further, the additive composition for a plating solution according to the present invention has the advantage of OR plating, which is evaluated as the best plating material because it does not cause skin allergy unlike the existing IR plating solution, and has high economic efficiency compared to OR, whereby this is useable as an OR substitute.

On the other hand, the plating performance becomes more excellent as the plating solution contains a lot of harmful substances such as nickel. However, the additive composition for a plating solution according to the present invention contains some materials such as tungsten, indium, phosphorous, etc., thereby implementing excellent plating performance while being harmless to the human body.

DETAILED DESCRIPTION

In one aspect, the present invention relates to an additive composition for a plating solution, including at least one material selected from the group consisting of tungsten, phosphorus and indium.

When the additive composition for a plating solution according to the present invention (hereinafter, "additive composition for a plating solution") is added to an existing IR plating solution, the wear resistance of plating is improved so that it can be used for a long time, and the gloss is excellent and maintained for extended time after plating. Further, the additive composition for a plating solution has the advantage of OR plating, which is evaluated as the best plating material because it does not cause skin allergy unlike the existing IR plating solution, and also has high economic efficiency compared to OR, thereby being useable as an OR substitute.

Herein, the tungsten may be sodium tungsten, and specifically, sodium tungstate dehydrate having CAS number 10213-10-2 or CAS number 13472-45-2.

The phosphorus may be sodium hypophosphite monohydrate (CAS number 10039-56-2) or potassium pyrophosphate (CAS number 7320-34-5).

The indium may be indium sulfate (CAS number 13464-82-9).

The additive composition for a plating solution may further include sodium citric acid having CAS number 18996-35-5 or CAS number 6132-04-3 or citric acid (CAS number 77-92-9) and/or potassium sodium tartrate (CAS number 6381-59-5).

The additive composition for a plating solution may have improved wear resistance and long-lasting gross compared to the existing IP plating solution by the above combination, does not cause skin allergy, and is inexpensive.

Meanwhile, a relative weight ratio of phosphorus to tungsten may be 1:1 to 10, a relative weight ratio of tungsten to indium may be 1:400 to 600, and a relative weight ratio of phosphorus to indium may be 1:1000 to 2500.

The additive composition for a plating solution may have improved wear resistance and long-lasting gloss compared to the existing IR plating solution due to a combination of the above materials and the relative weight ratio between the materials, and may exhibit effects of not causing skin allergy. Accordingly, the additive composition for a plating solution may be used for improving wear resistance and maintaining gloss.

In another aspect, the present invention relates to a method for preparation of an additive composition for a plating solution in which tungsten, phosphorus and indium are sequentially added.

When the composition prepared by the method for preparation of an additive composition for a plating solution is added to the existing IR plating solution, wear resistance of the plating is improved to thus enable a long-term use, gloss after plating is excellent, and a gloss lasting time is prolonged. Further, the additive composition for a plating solution has the advantage of OR plating, which is evaluated as the best plating material because it does not cause skin allergy unlike the existing IR plating solution, and has high economic efficiency compared to OR, thereby being useable as an OR substitute With regard to the method for preparation of an additive composition for a plating solution, tungsten may be sodium tungsten, and specifically, sodium tungstate dehydrate having CAS No. 10213-10-2 or CAS No. 13472-45-2. The phosphorus may also be sodium hypophosphite monohydrate (CAS number 10039-56-2) or potassium pyrophosphate (CAS number 7320-34-5). The indium may be indium sulfate (CAS number 13464-82-9).

When the additive composition for a plating solution is prepared, sodium citrate having CAS No. 18996-35-5 or CAS No. 6132-04-3 may be further included, or citric acid (CAS No. 77-92-9) and/or potassium sodium tartrate (CAS number 6381-59-5) may be further included.

Meanwhile, a relative weight ratio of phosphorus to tungsten may be 1:1 to 10, a relative weight ratio of tungsten to indium may be 1:400 to 600, and a relative weight ratio of phosphorus to indium may be 1:1000 to 2500.

Hereinafter, the present invention will be described in more detail by means of examples. The embodiments described below are merely for explaining in detail enough that a person of ordinary skill in the art to which the present invention pertains ("those skilled in the art") can easily implement the invention, which does not mean that the protection scope of the present invention is limited.

[Comparative Example] Plating with IR Plating Solution

After heating 80 liters of water to 40° C., 6 Kg of soda cyanide, 1.5 Kg of copper cyanide, 150 g of zinc cyanide, 2 Kg of Rossel salt, 1.6 Kg of caustic soda and 4.0 Kg of sodium oxalate were added and stirred. Water was added to reach a total amount of 100 liters, followed by heating to 60° C. and aging for 24 hours to complete the preparation of IR plating solution. Using the prepared IR plating solution, plating was completed by a conventional plating method, thereby obtaining a product of this comparative example.

[Example 1] Plating by Adding a Composition Containing Only Tungsten to an IR Plating Solution After heating 1 liter of water to 80° C., 120 g of sodium citrate and 10 g of sodium tungstate dehydrate were sequentially added to prepare an additive composition for a plating solution. Then, the prepared composition was added to the IR plating solution of Comparative Example 1 (10% of the IR volume), plating was completed by a conventional plating method, thereby obtaining a product of Example 1.

[Example 2] Plating by Adding a Composition Containing Only Phosphorus to an IR Plating Solution After heating 1 liter of water to 80° C., 120 g of sodium citrate and 40 g of sodium hypophosphite monohydrate were sequentially added to prepare an additive composition for a plating solution. This prepared composition was added to the IR plating solution of Comparative Example 1 (10% of the IR volume), and then, plating was completed by a conventional plating method, thereby obtaining a production of Example 2.

[Example 3] Plating by Adding a Composition Containing Only Indium to an IR Plating Solution After heating 1 liter of water to 80° C., 120 g of sodium citrate and 0.02 g of indium sulfate were sequentially added to prepare an additive composition for a plating solution. This prepared composition was added to the IR plating solution of Comparative Example 1 (10% of the IR volume), and then, plating was completed by a conventional plating method, thereby obtaining a product of Example 3.

[Example 4] Plating by Adding a Composition Containing Tungsten and Phosphorus to an IR Plating Solution After heating 1 liter of water to 80° C., 120 g of sodium citrate, 10 g of sodium tungstate dehydrate and 40 g of sodium hypophosphite monohydrate were sequentially added to prepare an additive composition for a plating solution. This prepared composition was added to the IR plating solution of Comparative Example 1 (10% of the IR volume), and then, plating was completed by a conventional plating method, thereby obtaining a product of Example 4.

[Example 5] Plating by Adding a Composition Containing Tungsten and Indium to an IR Plating Solution After heating 1 liter of water to 80° C., 120 g of sodium citrate, 10 g of sodium tungstate dehydrate and 0.02 g of indium sulfate were sequentially added to prepare an additive composition for a plating solution. This prepared composition was added to the IR plating solution of Comparative Example 1 (10% of the IR volume), and then, plating was completed by a conventional plating method, thereby obtaining a product of Example 5.

[Example 6] Plating by Adding a Composition Containing Phosphorus and Indium to an IR Plating Solution After heating 1 liter of water to 80° C., 120 g of sodium citrate, 40 g of sodium hypophosphite monohydrate and 0.02 g of indium sulfate were sequentially added to prepare an additive composition for a plating solution. This prepared composition was added to the IR plating solution of Comparative Example 1 (10% of the IR volume), and then, plating was completed by a conventional plating method, thereby obtaining a product of Example 6.

[Example 7] Plating by Adding a Composition Containing all of Tungsten, Phosphorus and Indium to an IR Plating Solution After heating 1 liter of water to 80° C., 120 g of sodium citrate, 10 g of sodium tungstate dehydrate, 40 g of sodium hypophosphite monohydrate and 0.02 g of indium sulfate were sequentially added to prepare an additive composition for a plating solution. This prepared composition was added to the IR plating solution of Comparative Example 1 (10% of the IR volume), and then, plating was completed by a conventional plating method, thereby obtaining a product of Example 7.

[Experimental Example 1] Wear Resistance Measurement

In order to measure the wear resistance shown in Comparative Example and Examples under the following conditions, a wear resistance experiment was requested to the KOREA TESTING & RESEARCH INSTITUTE and the results shown in Table 1 below were obtained (Report No. TAK-2020-034805, Report No. TAK-2020-034806, Report No. TAK-2020-099728, Report No. TAK-2020-099729, Report No. TAK-2020-099730, Report No. TAK-2020-099731, Report No. TAK-2020-099732, Report No. TAK-2020-0099733).

As can be seen in Table 1, when the additive composition for a plating solution includes at least one material selected from the group consisting of tungsten, phosphorus and indium, the wear resistance is improved (Examples 1 to 3), and among them, especially, in the case of including tungsten and phosphorus (Example 4), the case of including tungsten and indium (Example 5), and the case of including all of tungsten, phosphorus and indium (Example 7), it could be confirmed that the wear resistance is significantly excellent.

[Conditions]

Test load: 1500 g

Friction body: Sand Eraser (502, hinodewashi)

Test area: 2 cm 2

Test speed: 40 times/min

Determination criteria: Confirmation of exposure of copper layer on the surface (visual determination)

TABLE 1

| Experimental group | Number of frictions at which exposure of copper layer is observed |
|---|---|
| Comparative Example | 23 |
| Example 1 | 72 |
| Example 2 | 63 |
| Example 3 | 61 |
| Example 4 | 142 |
| Example 5 | 113 |
| Example 6 | 74 |
| Example 7 | 191 |

[Experimental Example 2] Gloss Measurement

For Comparative Example and Examples, the gloss was measured visually. The relative degree of change in each example with respect to the comparative example is shown in Table 2 below. As can be seen in Table 2, when the additive composition for a plating solution includes tungsten and phosphorus (Example 4), and when phosphorus and indium are included (Example 6), gloss increases, and in particular, in the case of including all of tungsten, phosphorus and indium (Example 7), it could be confirmed that it has remarkably excellent gloss.

TABLE 2

| Experimental group | Gloss |
|---|---|
| Comparative Example | Standard |
| Example 1 | Darkening |
| Example 2 | As it is |
| Example 3 | As it is |
| Example 4 | Slightly increased |
| Example 5 | As it is |
| Example 6 | Slightly increased |
| Example 7 | Greatly increased |

As the specific contents of the present invention have been described in detail above, it will be apparent to those of ordinary skill in the art that these specific descriptions are only preferred embodiments, and the scope of the present invention is not limited thereby. Accordingly, it is intended that the substantial scope of the present invention will be defined by the appended claims and their equivalents.

When the additive composition for a plating solution according to the present invention is added to an existing IR plating solution, it can be used for a long period of time, and the gloss becomes excellent after plating, and the gloss-lasting time is prolonged.

Further, since the additive composition for a plating solution according to the present invention does not cause skin allergy, it has the advantage of OR plating and high economic efficiency compared to OR, thereby being useable as an OR substitute.

On the other hand, the additive composition for a plating solution according to the present invention can realize excellent plating performance while being harmless to the human body.

What is claimed is:

1. A composition for an imitation rhodium plating the composition comprising:

a solution comprising copper, tin and zinc; and an additive comprising tungsten and indium;

wherein the tungsten is sodium tungsten, and the indium is indium sulfate.

2. The composition according to claim 1, wherein a relative weight ratio of the tungsten to the indium is 1:400 to 600.

3. A method for plating an object, the method comprising: applying to the object the composition of claim 1.

4. The method of claim 3, wherein the additive comprises the tungsten comprising sodium tungsten, and the indium comprising indium sulfate, and a relative weight ratio of the tungsten to the indium is 1:400 to 600.

5. A composition for an imitation rhodium plating, the composition comprising:

a solution comprising copper, tin and zinc; and an additive comprising tungsten, phosphorus and indium, wherein the tungsten is sodium tungsten, the phosphorus is sodium hypophosphite monohydrate or potassium pyrophosphate, and the indium is indium sulfate.

6. The composition according to claim 5, wherein a relative weight ratio of the phosphorus to the tungsten is 1:1 to 10, a relative weight ratio of the tungsten to the indium is 1:400 to 600, and a relative weight ratio of the phosphorus to the indium is 1:1000 to 2500.

7. A method for plating an object, the method comprising: applying to the object a plating solution comprising the additive composition of claim 5.

8. The method of claim 7, wherein the additive composition comprises the tungsten comprising sodium tungsten, the indium comprising indium sulfate, and the phosphorus comprising sodium hypophosphite monohydrate or potassium pyrophosphate, and a relative weight ratio of the phosphorus to the tungsten is 1:1 to 10, a relative weight ratio of the tungsten to the indium is 1:400 to 600, and a relative weight ratio of the phosphorus to the indium is 1:1000 to 2500.

* * * * *